July 26, 1949.    G. E. SORENSEN    2,477,012
SELF-SYNCHRONOUS POSITIONING CONTROL
Filed July 13, 1946
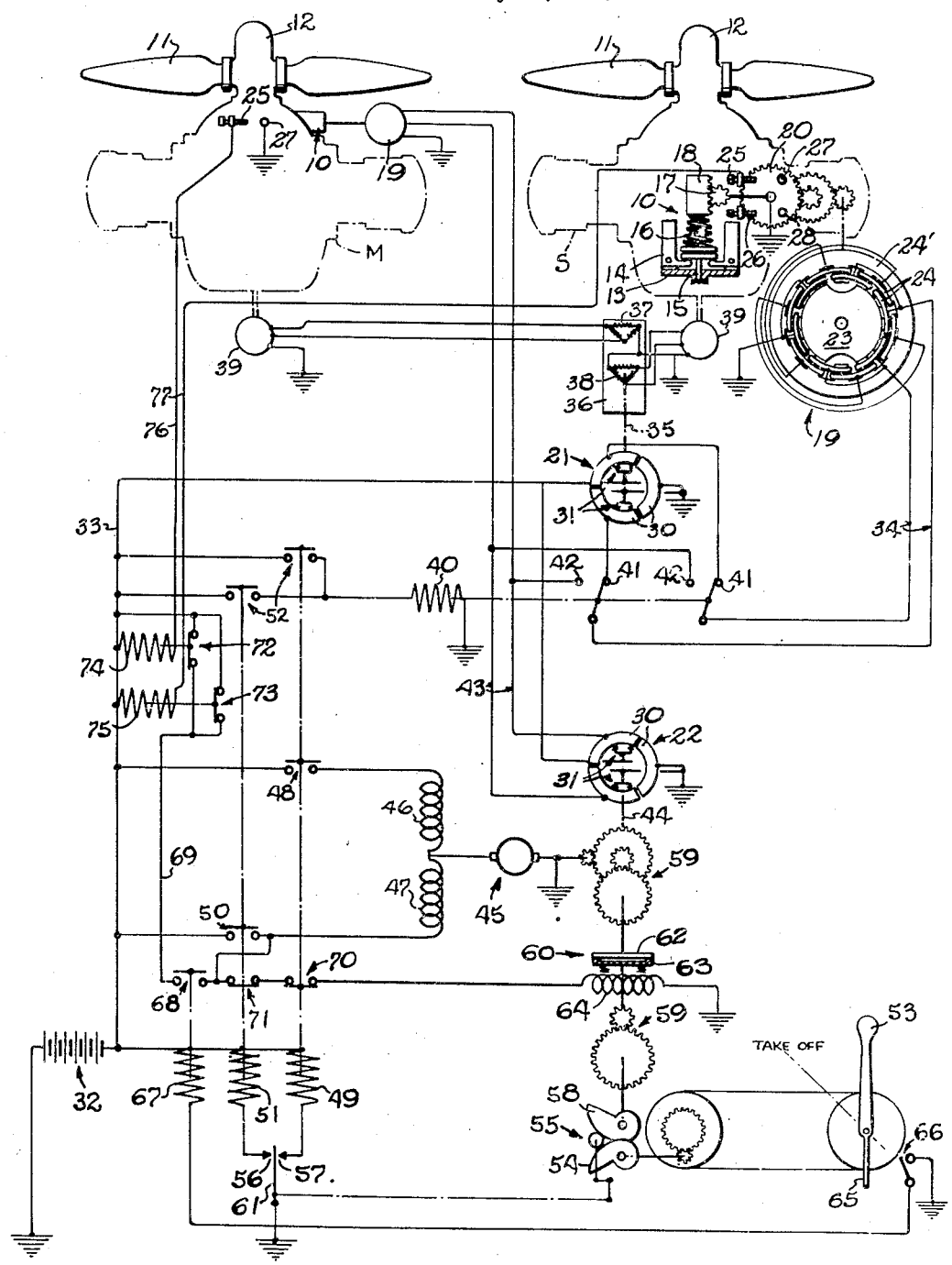
INVENTOR
George E. Sorensen
By Carlson, Pitzner, Hubbard & Wolfe
ATTORNEY Patented July 26, 1949

2,477,012

UNITED STATES PATENT OFFICE 2,477,012

SELF-SYNCHRONOUS POSITIONING CONTROL

George E. Sorensen, Rockford, Ill., assignor to Woodward Governor Company, Rockford, Ill., a corporation of Illinois Application July 13, 1946, Serial No. 683,298

8 Claims. (Cl. 318—19)

This invention relates to a control mechanism for adjusting a plurality of independently movable devices through the intermediary of self-synchronous electrical systems controllable from a remote point.

The primary object is to provide a novel mechanism for controlling the self-synchronizing systems in a novel manner to adjust all of the devices by varying amounts or to bring all of the devices to predetermined corresponding positions.

The invention also resides in the novel structural character means for effecting the supplemental limit control.

Other objects and advantages of the invention will become apparent from the following detailed description taken in connection with the accompanying drawing which is a schematic view and wiring diagram of a plurality of power units adapted to be governed by a positioning control embodying the present invention.

The invention is shown for purposes of illustration incorporated in a system for manually adjusting the speeds of a plurality of internal combustion engines and also for automatically synchronizing the speed of one or more engines S with that of a master engine M. Herein, the speeds of the power units are controlled by individual governors 10 which, in the case of aircraft engines, effect a speed regulation by adjusting the pitch of propellers 11 driven by the engines. This may be accomplished by applying hydraulic pressure controlled by the governor to a servo motor 12 or turning the propeller blades on their longitudinal axes.

The governor 10 on each slave and master engine includes a head 13 driven by the engine and pivotally supporting flyballs 14 which are connected to a rod 15 urged downwardly by an adjustable speeder spring 16 and actuating a valve that regulates the flow of pressure fluid to and from the servo 12. Thus, the governor operates automatically in a known manner to vary the propeller pitch and maintain the speed of the engine at a constant value determined by the adjustment of the speeder spring 16. Such adjustment may be effected by turning a pinion 17 meshing with a rack on a movable abutment 18 engaging the spring.

The pinion 17 is adapted to be turned by an electric motor 19 mounted on the governor casing and acting through speed reduction gearing terminating with a gear 20 on the pinion shaft. The motor is the receiver of a self-synchronous electrical system controllable either from a rotary transmitter 21 or a transmitter 22 located at a remote point of control such as the pilot's cabin of an airplane. Herein, the electrical receiver 19 is of the step motor type having a permanently magnetized rotor 23 adapted to occupy any one of twelve well defined angular positions according to the combination of direct current potentials applied to three sets of distributed windings 24 on the motor stator 24. When these windings are deenergized, the rotor will come to an abrupt stop and be held magnetically.

The range of movement of each speed adjusting device 18 is positively limited as by stops in the form of screws 25 and 26 adjustably mounted on the governor casing and engageable by lugs 27 and 28 on the gear 20. The minimum speed is determined by the stop 26 while the maximum speed is limited by the stop 25. In accordance with the present invention, the stops 25 of all of the engines M and S are set for substantially the same speed corresponding to that commonly used during take-off. Thus, when the speed adjusters 18 are positioned against their respective stops 25, all of the engines will be brought to the same speed.

Herein the self-synchronous transmitters 21 and 22 are commutator switches each comprising angularly spaced segments 30 engaged by contacts 31 which are arranged in pairs respectively connected to the different polar terminals of a battery 32 through a conductor 33 and a grounded conductor. The segments 30 are connected directly to the windings of the step motor 19 through a ground and conductors 34. The construction of the step motor is such that as the switch shaft 35 turns in one direction, the windings of the step motor will be energized in successive combinations causing the rotor 23 to follow the movements of the switch shaft. Reverse operation of the motor takes place when the rotor of the transmitter 21 is turned in the opposite direction.

To effect automatic synchronizing, the speed of each slave engine S is compared with that of the master engine M, and any difference is utilized to turn the corresponding transmitter switch 21 in a corresponding direction and by an amount such as to correct for the speed deviation. Such speed matching is effected by a differential motor or so-called differential Selsyn 36 comprising a three phase two pole stator and a three phase two pole rotor the rotor being fast on the shaft 35. The windings 37 and 38 are energized by small permanent magnet generators represented diagramatically at 39 and respectively mounted on the engines M and S and driven thereby.

With both windings of the differential motor energized and with the engines M and S running at the same speed, the frequencies of the two current sources will be identical so that the shaft of the differential motor will not turn, and therefore, the commutator switch 21 will be idle. When the speeds of the master and slave engines are different, the frequencies of the current supplied by the respective generators will differ proportionately, and the rotor of the differential motor will turn in a direction determined by which frequency is higher. Such operation of the motor and the commutator switch 21 driven thereby will continue until the slave engine has, by operation of the step motor 19 and the speed correcting means associated therewith, been brought into synchronism with the speed of the master engine M.

The differential motor 36 is disabled at certain times, as during the adjustment of the engine speeds under manual control, by energization of a relay 40. This opens switches 41 thereby disconnecting the transmitter 21 from the receiving motor 19 of the slave engine S. At the same time, switches 42 are closed to complete an electrical connection between the motor 19 and conductors 43 leading from the auxiliary commutator switch 22 to the step motor of the governor on the master engine M.

For the purpose of adjusting the speed regulators 18 of all of the governors 10 under manual control from the remote point, the shaft 44 of the common transmitter or commutator switch 22 is connected through speed reduction gearing to the shaft of a reversible motor 45 which runs in one direction or the other according to which of its windings 46 or 47 is energized from the battery 32. The circuit for the winding 46 is closed by a switch 48 when a relay 49 is energized, while the winding 47 is energized by closure of a switch 50 when a relay 51 is energized. One of two switches 52 will be closed when either relay 49, 51 is energized. This completes a circuit for energizing the relay 40, thereby disconnecting the commutator switch 21 from the step motor 19 to disable the synchronizing control while connecting the step motor of all of the power units to the commutator switch 22 so as to condition the units for manual adjustment of their speeds.

The speed adjusting motor 45 is started in one direction or the other by movement of a manually operable lever 53 to a position corresponding to a newly selected speed setting where the lever is retained as by friction. Such movement turns one part 54 of a follow-up cam mechanism 55 to close a corresponding one of two switches 56, 57 for energizing one of the relays 49, 51. The motor 45 is started and continues to run in the proper direction until a follow-up cam 58 driven through speed reduction gearing 59 and clutch 60 allows the arm 61 to move and open the then closed control switch 56 or 57 whereupon the motor 45 will be stopped automatically. By correlating the various gear trains, the range of motion of the hand lever 53 will correspond to the range of speed adjustment of the governors 10 so that the latter will, after each change in the setting of the lever 53, be adjusted by its motor actuator for the maintenance of a corresponding engine speed.

In response to deenergization of both of the relays 49 and 51 as the governors become adjusted to the new speed, the switches 52 will again be opened. This results in deenergization of the relay 40 thereby disconnecting the step motors from the adjusting commutator switch 22 and placing only the slave motors 19 under the control of the synchronizing commutator switch 21. Manual control is thus withdrawn and the synchronizing control is restored automatically.

The clutch 60 is of the electromagnetic friction type, having driving and driven elements 62 and 63 connected to the motor 45 and the follow-up cam 58 respectively. The elements are spring urged into gripping engagement, thereby maintaining the driving connection between the motor and the cam so long as a winding 64 remains deenergized. When the winding is energized, the clutch is released thereby interrupting the drive to the follow-up cam 58.

The present invention contemplates bringing all of the power units M and S to the same predetermined speed determined by the high speed stops 25 of the respective governors 10, preferably in response to movement of the control lever 53 to a high speed or take off position as indicated. This is accomplished in the present instance by continuing the speed increasing operation of the adjusting motor 45 after the high speed setting has been attained as determined by the follow-up mechanism 55 so as to insure that the speed adjuster 18 of all of the governors will come against their stops.

For this purpose, an extension 65 of the lever 53 is adapted to close a switch 66 when the lever is moved to the take off position. This completes a circuit for energizing a relay 67 to close a switch 68 in an auxiliary energizing circuit 69 for the speed increasing winding 47 of the motor 45. This circuit includes parallel switches 72 and 73 which are normally closed and are opened by energization of relays 74 and 75 having conductors 76 and 77 respectively extending to the stops 25 of the different governors. These stops cooperate with the lugs 27 to form switches, each of which remains open until its associated speed adjuster 18 reaches the maximum speed setting. Thus the motor winding 47 remains energized until the governors of each of the engines M and S have been brought to the same speed setting at which time all of the switches 72 and 73 will be opened thereby stopping the motor 45. Accurate calibration of the different power units is thus attained under the control of a device such as the hand lever 53 located remotely from the engines.

Provision is made for energizing the clutch winding 64 to release the clutch and disconnect the follow-up mechanism 55 when the latter reaches the high speed setting, the position of the cam 58 therefore remaining unchanged in the subsequent operation of the motor 45 that completes the calibrating action. To this end, the circuit for energizing the clutch winding extends from the battery through the normally closed parallel switch 72, 73, the switch 68 of the calibration relay 67 and switches 70 and 71 which are normally closed but opened by energization of the relays 49 and 51 respectively. Thus, energization of the winding 64 to release the clutch is conditioned upon manual closure of the switch 66 and therefore of the switch 68 combined with satisfaction of the follow-up mechanism 55 in its high speed position as evidenced by opening of both switches 56 and 57 and closure of the associated switches 70, 71. During the calibrating adjustment following movement of the lever 53 to the take off position, the switch 71 will be held open by the relay 51 and the clutch 60 maintained engaged until the follow-up mechanism 55 is continued for operation of the engines at maximum or take off speed. At this time, the relay 51 will become deenergized as the switch 56 is opened by the cam 58 thereby closing the circuit for energizing the clutch windings 64. The clutch is thus released so that in the continued but short ensuing operation of the motor 45, which may be necessary in order to bring all of the engines M and S to the same take off speed, the cam 58 will not be moved. As a result, the calibrating adjustments of the engine speeds are effected while at the same time leaving the follow-up mechanism 55 conditioned for proper operation when the automatic synchronizing control is restored or when the manual control is used to reduce the engine speeds after take off. During the latter adjustment, caused by energization of the relay 49, the switch 70 is held open so that the clutch winding 64 remains deenergized and the follow-up mechanism thereby connected to the adjusting motor 45.

With the calibrating control described above, all of the different power units may be brought precisely to the same speed by a simple manipulation at the remote point of control. Such calibration is effected in every instance during take off and as an incident thereto, the follow-up mechanism is left conditioned for proper operation during subsequent control for automatic synchronizing or readjustment of the engine speeds. Except for the limit stops 25, the principal parts of the calibrating control are located remotely from the engines and such control operates through the intermediary of the main actuating parts of the automatic synchronizing and manual speed adjusting controls. As a result, the equipment required to be added in order to effect the calibrating control is reduced to a minimum and is of simple character and well suited to stand up under conditions encountered in multiengine air craft.

I claim as my invention:

1. Mechanism for selectively positioning a plurality of independently movable elements comprising individual self-synchronous reversible electric motors for actuating the respective elements, stops limiting the movements of the respective elements in one direction to corresponding limit positions, a self-synchronous rotary transmitter for energizing all of said motors, a motor driven operator for driving said transmitter, manually operable means for controlling the operation of said operator including a member movable back and forth to select different speed settings for said elements, follow-up means driven by said operator through a releasable clutch for interrupting the operation of the operator when said transmitter has been turned to a position corresponding to the selected position of said member, supplemental means operable automatically as an incident to movement of said member to a predetermined position for continuing the operation of said operator and transmitters until all of said elements have reached their respective limit stops, and means for releasing said clutch when said manually movable member is in said predetermined position and the follow-up means reaches a corresponding position.

2. Mechanism for selectively positioning a plurality of independently movable elements comprising individual electric motors for actuating the respective elements, stops limiting the movements of the respective elements in corresponding limit positions, a self-synchronous rotary transmitter for energizing all of said motors, a motor driven operator for driving said transmitter, manually operable means for controlling the operation of said operator including a member movable back and forth to select different speed settings for said elements, follow-up means driven by said operator through a releasable clutch for interrupting the operation of the operator when said transmitter has been turned to a position corresponding to the selected position of said member, supplemental manually operable control means for continuing the operation of said operator and transmitters until all of said elements have reached the respective limit stops, and means for releasing said clutch when said member is disposed in a predetermined position and the follow-up means reaches a corresponding position.

3. Mechanism for selectively positioning a plurality of independently movable devices comprising individual self-synchronous power actuators for the respective devices, self-synchronous electrical transmitting means located at a remote point of control and associated with said actuators for energizing the latter simultaneously, individual stops for limiting the adjustment of the respective devices in one direction, an electric motor for driving said transmitting means, means controlling the energization of said motor including a member manually movable toward and away from a predetermined position, follow-up means driven by said motor and normally operable to interrupt the operation thereof when said transmitting means has been moved a distance corresponding to a changed position of said member, and supplemental means responsive to movement of said member to said predetermined position and controlling said motor independently of said follow-up means to continue operation of said motor until each of said devices has reached its limit stop.

4. Mechanism for selectively positioning a plurality of independently movable devices comprising individual self-synchronous power actuators for the respective devices, self-synchronous electrical transmitting means located at a remote point of control and associated with said actuators for energizing the latter simultaneously, individual stops for limiting the adjustment of the respective devices in one direction, a motor for driving said transmitting means, means controlling the energization of said motor including a member manually movable toward and away from a predetermined position, follow-up means driven by said motor and normally operable to interrupt the operation thereof when said transmitting means has been moved a distance corresponding to a changed position of said member, and supplemental manually controllable means controlling said motor independently of said follow-up means to continue operation of said motor until each of said devices has reached its limit stop.

5. Mechanism for selectively positioning a plurality of independently movable devices comprising individual self-synchronous power actuators for the respective devices, self-synchronous electrical transmitting means located at a remote point of control and associated with said actuators for energizing the latter simultaneously, individual stops for limiting the adjustment of the respective devices in one direction, an electric motor for driving said transmitting means, means controlling the energization of said motor including a member manually movable toward and away from a predetermined position, follow-up means driven by said motor through a releasable clutch and normally operable to interrupt the operation thereof when said transmitting means has been moved a distance corresponding to a changed position of said member, supplemental means providing an auxiliary circuit for said motor for continuing operation of the motor after the follow-up means is satisfied and until each of said devices has reached its limit stop, and means conditioned for operation by actuation of said supplemental means and operable to release said clutch when the follow-up means reaches a predetermined position corresponding to the limit position of one of said devices.

6. Mechanism for selectively positioning a plurality of independently movable devices comprising individual stops for limiting the adjustments of the respective devices in one direction, individual self-synchronous power actuators for the respective devices, self-synchronous electrical transmitting means located at a remote point of control and associated with said actuators, a member manually movable back and forth to select different settings of said devices, means controlled by said member for moving said transmitting means a distance corresponding to each changed position of said member, and supplemental means responsive to movement of said member to a predetermined position to continue the operation of said transmitting means until all of said devices have reached their respective limit stops.

7. Mechanism for selectively positioning a plurality of independently movable devices comprising individual self-synchronous power actuators for the respective devices, self-synchronous electrical transmitting means located at a remote point of control and associated with said actuators for energizing the latter simultaneously, individual stops for limiting the adjustment of the respective devices in one direction, an electric motor for driving said transmitting means, a manually movable member at said remote point, a main circuit including follow-up switches for causing operation of said motor and said transmitting means to different positions selected by positioning of said member, and means providing an auxiliary circuit responsive to movement of said member and operable to continue the operation of said motor in the speed-increasing direction until all of said devices reach their respective stops.

8. Mechanism for selectively positioning a plurality of independently movable devices comprising individual self-synchronous power actuators for the respective devices, self-synchronous electrical transmitting means associated with said actuators for energizing the latter simultaneously, a manually movable member, power driven means started in response to a change in the position of said member, follow-up means for stopping said transmitting means after movement thereof through a corresponding distance, individual stops for limiting the adjustment of the respective devices in one direction, and selectively controllable means for continuing the operation of said actuators after said follow-up means has been satisfied and until all of said devices have reached their respective limit stops.

GEORGE E. SORENSEN.

REFERENCES CITED

The following references are of record in the file of this patent:

UNITED STATES PATENTS

| Number | Name | Date |
|---|---|---|
| 2,412,605 | Drake | Dec. 17, 1946 |